No. 688,959. Patented Dec. 17, 1901.
W. L. MITCHELL.
HOE.
(Application filed June 13, 1901.)
(No Model.)

Witnesses
J. P. Britt
Fanny Ellis Landen

Inventor
W. L. Mitchell,
by Landen & Landen
Attorneys

THE NORRIS PETERS CO., PHOTO-LITHO., WASHINGTON, D. C.

UNITED STATES PATENT OFFICE.

WALTER L. MITCHELL, OF COLLINS, MISSISSIPPI.

HOE.

SPECIFICATION forming part of Letters Patent No. 688,959, dated December 17, 1901.

Application filed June 13, 1901. Serial No. 64,407. (No model.)

*To all whom it may concern:*

Be it known that I, WALTER L. MITCHELL, a citizen of the United States, residing at Collins, in the county of Covington, State of Mississippi, have invented certain new and useful Improvements in Hoes; and I do hereby declare the following to be a full, clear, and exact description of the invention, such as will enable others skilled in the art to which it appertains to make and use the same.

This invention relates to agricultural tools; and it has for its object to provide a tool that may be adjusted to serve either as a hoe or a shovel, a further object of the invention being to provide a tool comprising but few parts and in which both the blade and the handle portion may be cast or the socket of the handle portion may be cast and provided with a wooden shank.

An additional object of the invention is to provide a construction that will be strong and durable and which may be easily and quickly adjusted.

Figure 1:
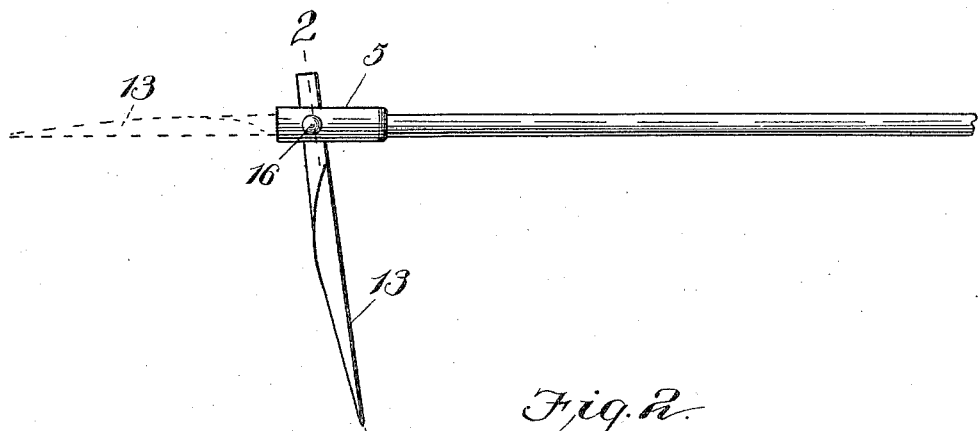
Figure 2:
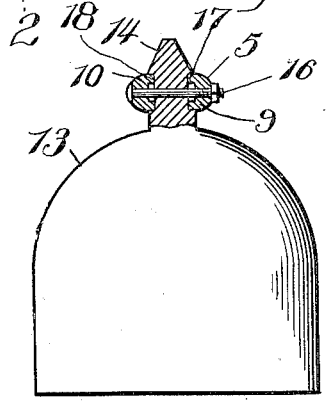
Figure 3:
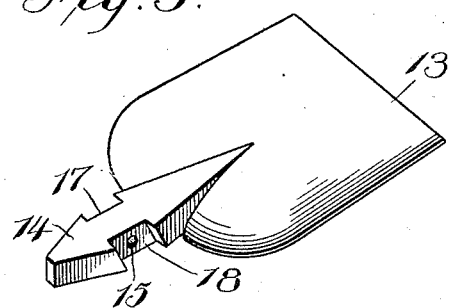
Figure 4:
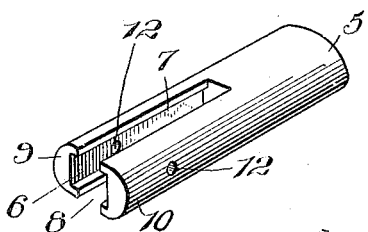

In the drawings forming a portion of this specification, and in which like numerals of reference indicate similar parts in the several views, Figure 1 is an elevation showing the tool adjusted as a hoe, the position of the blade when adjusted as a shovel being indicated in dotted lines. Fig. 2 is a section on line 2 2 of Fig. 1, being in a plane transversely of the socket of the handle and including the blade. Fig. 3 is a detailed perspective view of the blade. Fig. 4 is a detailed perspective view of the socket of the handle.

Referring now to the drawings, the tool includes a handle comprising a socket-piece 5 at one end, and in the free end of which socket-piece is formed a longitudinally-extending socket 6, which is oblong in cross-section, and opening through the long sides of this socket are slots 7 and 8, so that there are formed two parallel arms 9 and 10, having cross-sectionally-rectangular channels in their inner faces and extending longitudinally thereof. Through the parallel members are formed alining perforations 12 for a purpose to be presently explained.

The blade of the tool is shown at 13 and may have any desired specific shape, and from this blade there extends a cross-sectionally-oblong stem 14, the dimensions of which are such that the stem may be slid longitudinally into the socket of the handle and will fit the socket snugly. Through the stem 14 is formed a perforation 15, and when the stem is engaged with the socket this perforation alines with the perforations in the side of the socket to receive a latch-pin 16, which acts to hold the stem securely against displacement. This latch-pin may be in the form of a bolt having a nut or a key to hold it from displacement.

To permit of adjustment of the blade 13 to lie at an angle to the socket-piece and form a hoe, the stem 14 is slotted on its sides, as shown at 17 and 18, and these slots lie in parallel directions and at acute angles to the stem, and they are of such dimensions and arrangement that they will receive the parallel members or arms 9 and 10, which will closely fit in the slots and engage against the side walls thereof to prevent pivotal movement of the blade with respect to the handle. To hold the blade in this adjusted position, the pin or bolt 16 is engaged with the perforations in the stem or arms, said perforations alining in this position of the blade, as well as in the former position described.

It will be noted that both the blade and the socket-piece of the handle are of such construction that they may be cast so that their cost of manufacture will be very little, and at the same time, while the parts are held securely in their adjusted positions, the blade may be removed quickly and changed from one position to another.

It will be understood that in practice modifications of the specific construction shown may be made and any suitable materials and proportions may be used for the various parts without departing from the spirit of the invention.

What is claimed is—

1. A convertible tool comprising a handle having a socket-piece including spaced members having channels in their inner faces, and a blade having a stem adapted to fit with its sides in said channels, said stem having grooves in its sides adapted to receive the members of the socket-piece interchangeably with the engagement of the stem in the channels.

2. A convertible tool comprising a handle having an end piece including spaced members and a blade provided with a stem adapted for engagement longitudinally between the members and for engagement transversely between the members interchangeably, the stem having slots in its sides to receive the spaced members when the stem is in its transverse position.

3. A convertible tool comprising a handle having spaced members having channels in their inner faces, a blade having a stem adapted for engagement with the channels of the members, said stem being adapted to lie between and transversely of the members and having slots in its sides to receive the members when in its transverse position, said stem and sides having perforations for alinement in both positions of the stem, and a pin for engagement with the perforations to hold the parts against displacement.

In testimony whereof I hereunto sign my name, in the presence of two subscribing witnesses, on the 19th day of March, 1901.

WALTER L. MITCHELL.

Witnesses:
   W. L. WILLIAMSON,
   J. B. EASTERLING.